United States Patent [19]

Cali et al.

[11] Patent Number: 5,489,900
[45] Date of Patent: Feb. 6, 1996

[54] FORCE SENSITIVE TRANSDUCER FOR USE IN A COMPUTER KEYBOARD

[75] Inventors: Matthew F. Cali, Monroe; Jerome J. Cuomo, Lincolndale; Donald J. Mikalsen, Carmel; Joseph D. Rutledge, Mahopac, all of N.Y.; Edwin J. Selker, Palo Alto, Calif.

[73] Assignee: International Business Machines Corporation, Armonk, N.Y.

[21] Appl. No.: 253,655

[22] Filed: Jun. 3, 1994

[51] Int. Cl.⁶ .............................................. H03K 17/965
[52] U.S. Cl. ............................. 341/34; 341/22; 200/6 A; 345/168; 345/160; 338/99; 338/114; 338/128
[58] Field of Search ................................. 345/157, 160, 345/161, 168, 158; 341/22, 34; 200/6 A; 74/471 XY; 338/99, 128, 114

[56] References Cited

U.S. PATENT DOCUMENTS

| | | | |
|---|---|---|---|
| 3,673,354 | 6/1972 | Oda et al. | 179/100.41 V |
| 3,691,316 | 9/1972 | Oda et al. | 179/100.41 V |
| 4,322,707 | 3/1982 | Ort | 338/2 |
| 5,124,689 | 6/1992 | Franz et al. | 345/160 |
| 5,231,386 | 7/1993 | Brandenburg et al. | 345/168 |
| 5,252,971 | 10/1993 | Franz et al. | 341/34 |
| 5,278,557 | 1/1994 | Stokes et al. | 341/34 |

FOREIGN PATENT DOCUMENTS

| | | |
|---|---|---|
| 921837 | 3/1963 | United Kingdom . |
| 1148877 | 4/1969 | United Kingdom . |

*Primary Examiner*—Brent A. Swarthout
*Assistant Examiner*—Daniel J. Wu
*Attorney, Agent, or Firm*—Stephen C. Kaufman

[57] ABSTRACT

A strain sensitive columnar transducer for a data entry keyboard contains a column upstanding from the keyboard. Strain sensitive orthogonally oriented patterns are formed on a single flexible planar sheet which is sliced to place each of the patterns on a separate tab. The planar sheet is forced over the column so that the patterns lie up against the sides of the column to measure force exerted on the column.

10 Claims, 5 Drawing Sheets

FORCE SENSITIVE TRANSDUCER FOR USE IN A COMPUTER KEYBOARD

FIELD OF THE INVENTION

The present invention relates to the field of analog input devices for entering information into a computer and more particularly to a force sensitive device for entering analog information into a computer through its keyboard.

BACKGROUND OF THE INVENTION

The present invention provides an improved analog input device to be used in conjunction with the keys of the keyboard of a computer to enter data into the computer. The most common type of analog pointing device is a mouse, which sits on a surface immediately adjacent to the computer keyboard. As the mouse is moved on the adjacent surface the computer responds by moving a cursor around a computer screen.

Since the mouse is not on the keyboard, the operator is required to move his/her hand back and forth between the keyboard and the mouse with resulting delay and distraction.

In order to reduce the time involved in the back and forth motion of an operator's hand between the typing keyboard and the analog pointing device, various approaches for combining the typing keyboard and a pointing device have been proposed. One such approach involves the use of a force sensitive transducer positioned between two keys in a data input keyboard. In U.S. patent application Ser. No. 915,704, filed on Nov. 29, 1990 and entitled "Analog Input Device Located in The Primary Typing Area of the Keyboard" (Docket No. LX9-91-701P) one of the disclosed transducers is a column with a rectangular cross section that has strain sensitive sensors along its sides. The rectangular column is mounted on a base located under the G & H keys of a keyboard so that the column upstands from the base in the Z direction above the keys of the keyboard between the G & H keys. The sensors are connected in two half-bridges so that force exerted on the column by the operator is translated into electrical signals that reflect the components of the force in the x and y directions.

SUMMARY OF THE INVENTION

The present invention provides a new structure and method of fabricating a columnar sensor of the type described above. Instead of imprinting the patterns onto a ceramic columnar sensor during its fabrication or adhering separate discrete strain gauges to a plastic or metal column, the stress sensitive patterns are all formed on a single flexible sheet of plastic and an x shaped slice is made in the sheet to place each of the patterns on a separate triangular tab of the sheet. The sheet is placed over the column so that the tabs with the patterns on them are bent out of the plane of the sheet and form a collar around the column with each tab abutted against a different side of the rectangular column.

Therefore one object of the invention is to provide an improved force sensor for use in computer keyboards.

It is another object of the invention to provide a new method of fabricating a force sensor for use in computer keyboards.

BRIEF DESCRIPTION OF THE DRAWINGS

These and other objects of the invention can best be understood by the following description of the accompanying drawings of which.

DETAILED DESCRIPTION OF THE INVENTION

Figure 1:
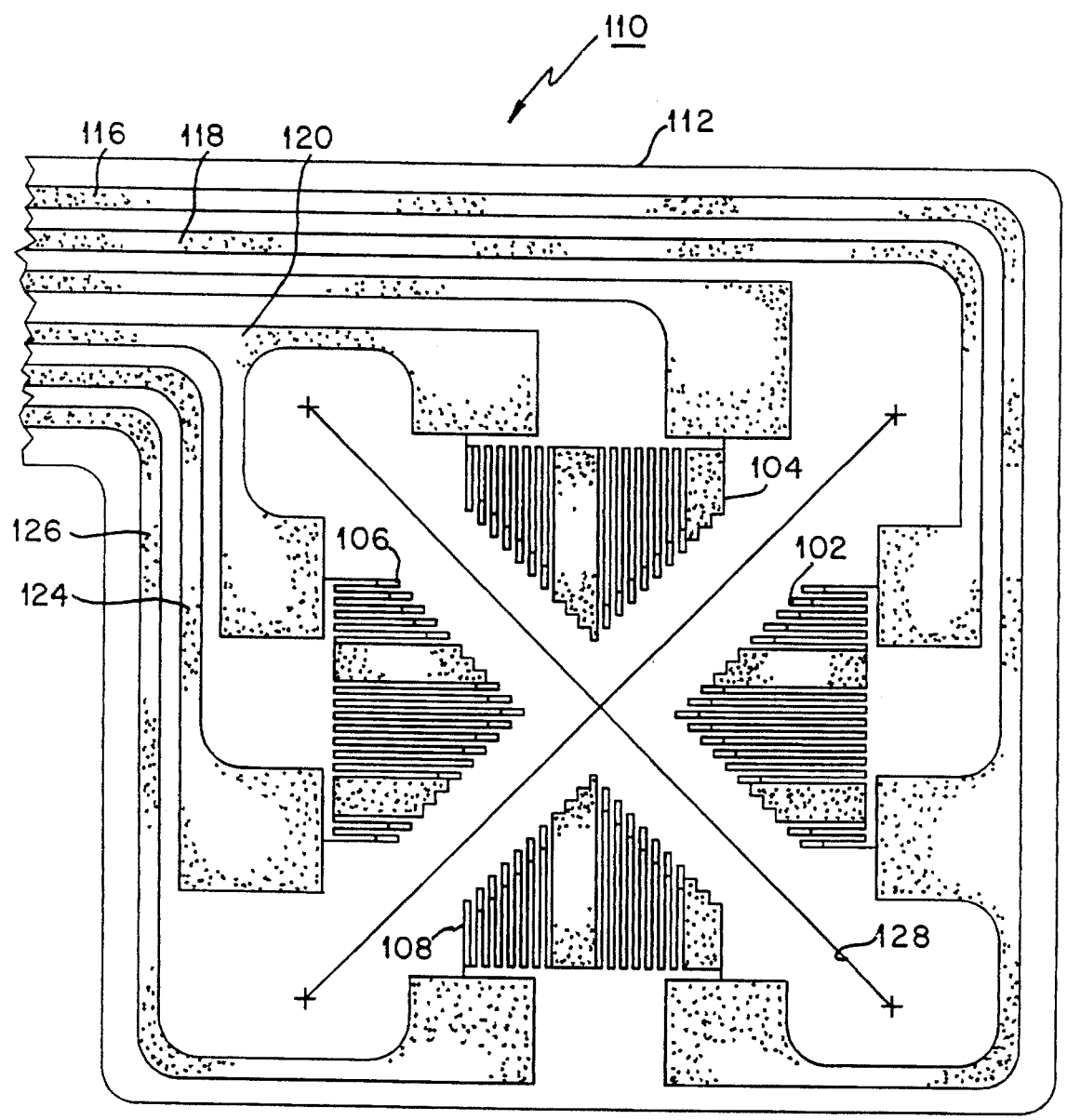
FIG. 1 is a plan view of the flexible plastic sheet imprinted with the strain sensitive resistance patterns.

Referring now to FIG. 1, serpentine patterns 102 to 108 of strain sensitive conductive material are formed on a flexible plastic sheet 110 which has a substantially rectangular portion 112. The opposite ends of each of the strain sensitive patterns 102 to 108 are connected to leads. The leads 116 to 126 are substantially wider than the conductive lines in the strain sensitive patterns 102 through 108. This is to make most of the circuits resistance reside in the patterns to thereby increase their sensitivity to strain. The patterns are arranged in sets. One set made up of patterns 102 and 106 is orthogonally oriented from the other set made up of patterns 104 and 108. The rectangular portion 112 of the flexible sheet is sliced in a x shaped pattern 128 so that each of the patterns 102 through 108 is on a separate triangular tab. The patterns 102 to 108 are triangular to make best use of the space on the tabs.

Figure 2:
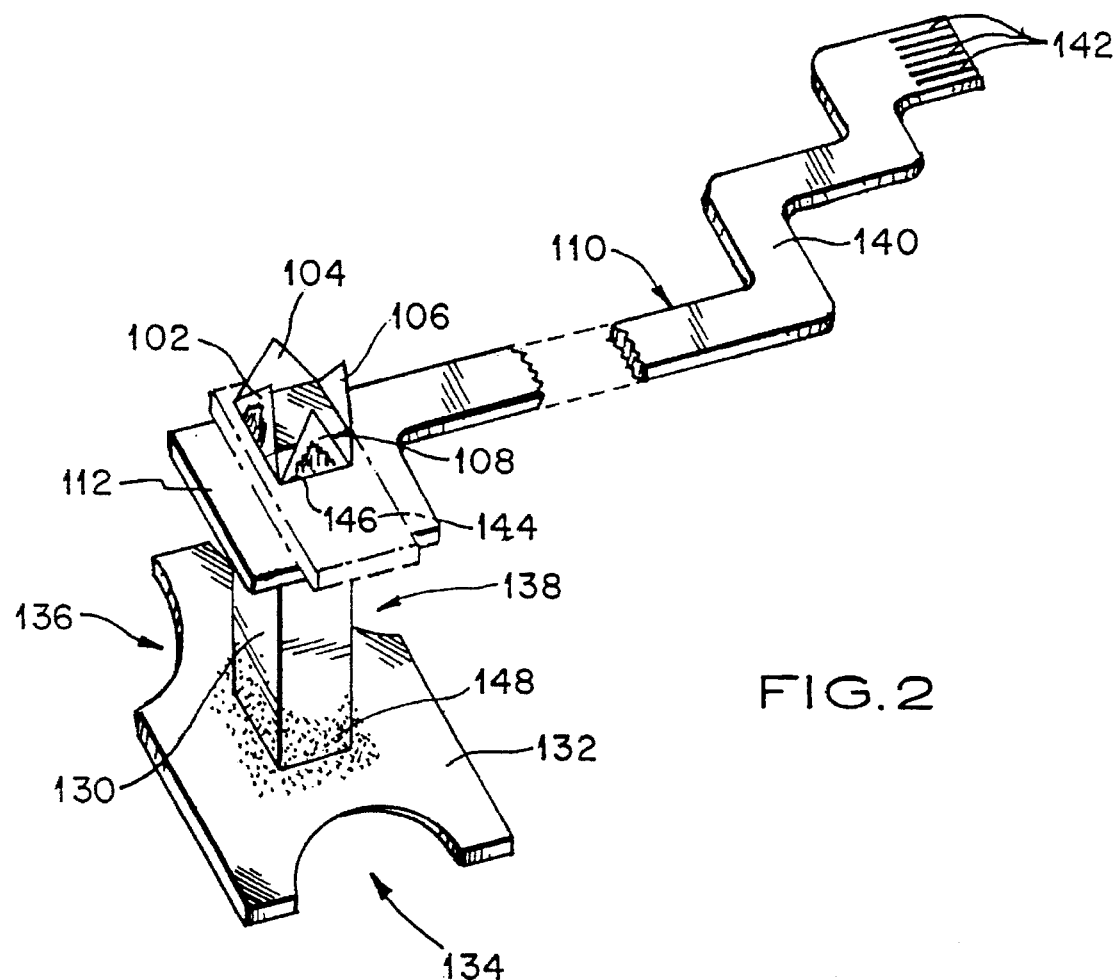
FIGS. 2 and 3 are three dimensional views showing the assembly of the pointing stick.

Referring now to FIG. 2, the sensor in the form of column 130 with a rectangular cross section is part of a plastic piece with a base 132. The base has three curved cutouts 134, 136 and 138 therein so that the base will fit between shields for the B, G & H keys on the computer keyboard without interfering with the functions of any keyboard keys. An arm is configured so that the base 132 will fit between the shields of the G & H keys while the cutout 134 permits the base to straddle the shield for the B key. While a separate base 132 is used here the column 130 could be integral with the keyboard base.

As shown in FIG. 2 the plastic sheet 110 has a leg portion 140 which is irregularly shaped to fit between the keys of the keyboard. This leg portion 140 contains the six leads 116 to 126 to the strain gauges and ends up in a foot element with terminal 142 to make electrical connections to the stress sensitive patterns 102 to 108. The stress sensitive patterns 102 to 108 and the leads 116 to 126 are enclosed within two sheets of plastic to prevent damage and exposure to the elements. If only one plastic sheet is employed the exposed patterns should face upwardly in the assembled keyboard so that they do not rub against the column 130 during assembly. The leg portion 140 can, as shown, be integrally formed with the base portion 112 or be a separate piece with the leads 116 to 126 bonded to the ends of the leads of the stress sensitive patterns on the base portion 112.

Figure 3:
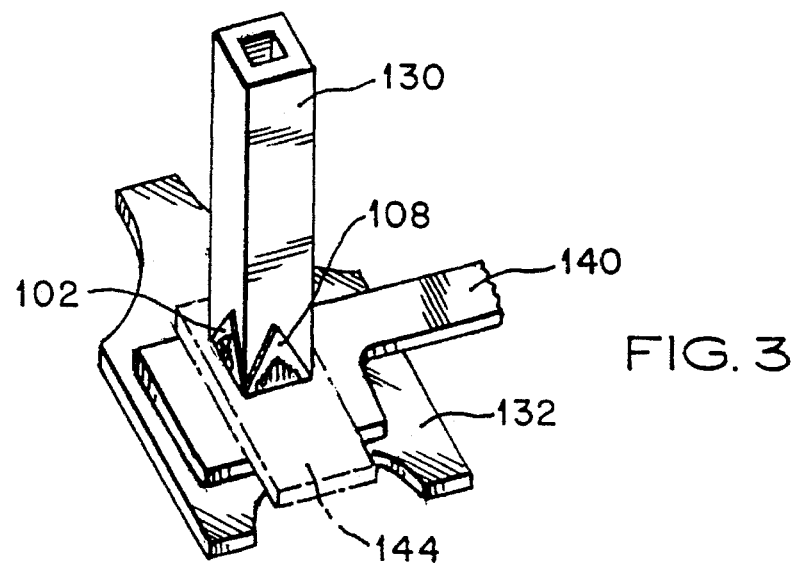
Figure 4:
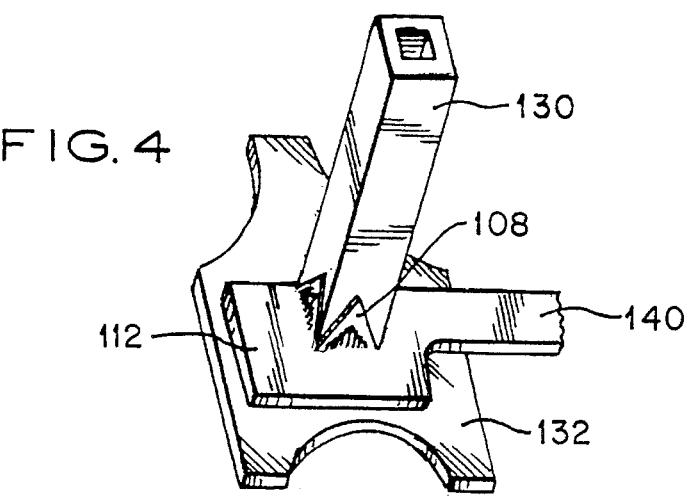
FIG. 4 is a three dimensional view of the assembled pointing stick.

As shown, the flexible plastic sheet 110 is placed on top of the column 130 and forced downwardly with a tool 144. The tool 144 contains a aperture 146 which is slightly larger than the column 130 so that as the plastic sheet 110 is forced down on the column by the tool the tabs flex upwardly through the aperture 146 and glide down along the sides of the column. The lower portion of the column is coated with an adhesive 148 as is the base 132 surrounding the column. As shown in FIG. 3, when the flexible sheet 110 reaches the base it is held against the base by the tool 144 with the tabs extending upwardly along the sides of the column 130. Tool 144 is held in place until the adhesive 148 sets. When the adhesive has set the guide is removed as shown in FIG. 4, leaving the plastic sheet adhered to the base 138 and the tabs adhered to the sides of the rectangular column 130 so that the strain sensitive patterns 102 to 108 are each against a separate side of the column to sense bending strain in the column.

Figure 5:
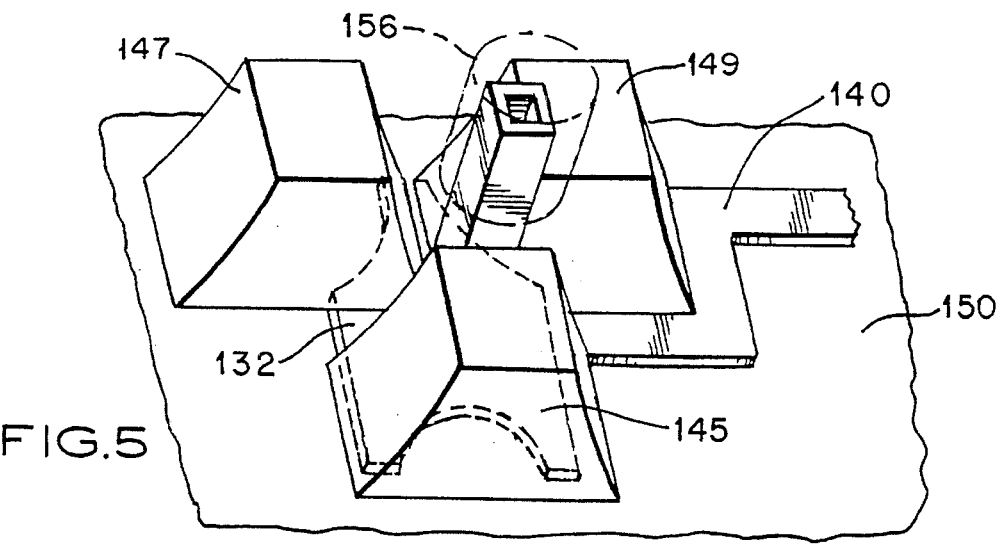
FIG. 5 is a three dimensional view of the pointing stick in position between the B, G & H keys.

As shown in FIG. 5 the column 130 sits between the B, G & H keys 145, 146 and 148 with the cutouts in the base 132 surrounding the shields for those keys. The leg portion 140 lies flat against the keyboard base 150 and is routed around other keys (not shown) so it does not interfere with the operation of the keys. A circular cap 156 is placed over the column 130 so that contact can be made by an operator to the sensor 130 by placing his finger on top of the cap. This causes strain in the column which can be sensed by the strain sensitive gauges 102 through 108.

Figure 6:
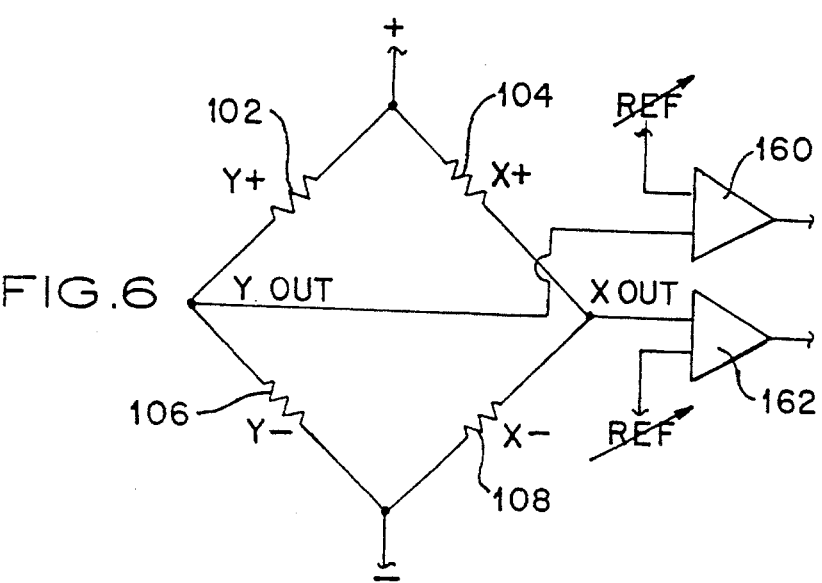
FIG. 6 is an electrical schematic of a bridge circuit incorporating the strain sensitive elements.

As shown in FIG. 6, the strain sensitive gauges 102 to 108 are connected in two half bridge circuits so that the set made up of strain sensitive patterns 102 and 106 measure strain exerted on the column in the y direction while the set made up of strain sensitive patterns 104 and 108 measure strain in the x direction. The bridges are connected across a power supply, while the terminals X out and Y out go to separate amplifiers 160 and 162. These amplifiers are differential amplifiers with the other input to the differential amplifier being a variable reference circuit. Upon turning on the computer and at various times during the operation of the computer, the reference voltages are adjusted to provide for zero outputs out of the amplifiers 160 and 162 when no force is exerted on the column 130.

The material used in the flexible sheet 110 and the material of the column must be compatible with the adhesive 148 used to fix the sheet to the piece also the guide must not adhere to the sheet or column during gluing. A combination that will meet these objectives is:

| Part | Material |
|---|---|
| plastic piece 130-132 | polycarbonate |
| flexible sheet 110 | polyimide (Kaptan e.g.) |
| adhesive 148 | Eastman 910 or epoxy cements used for strain gauges |
| tool 144 | teflon (TFE) |

Figure 7:
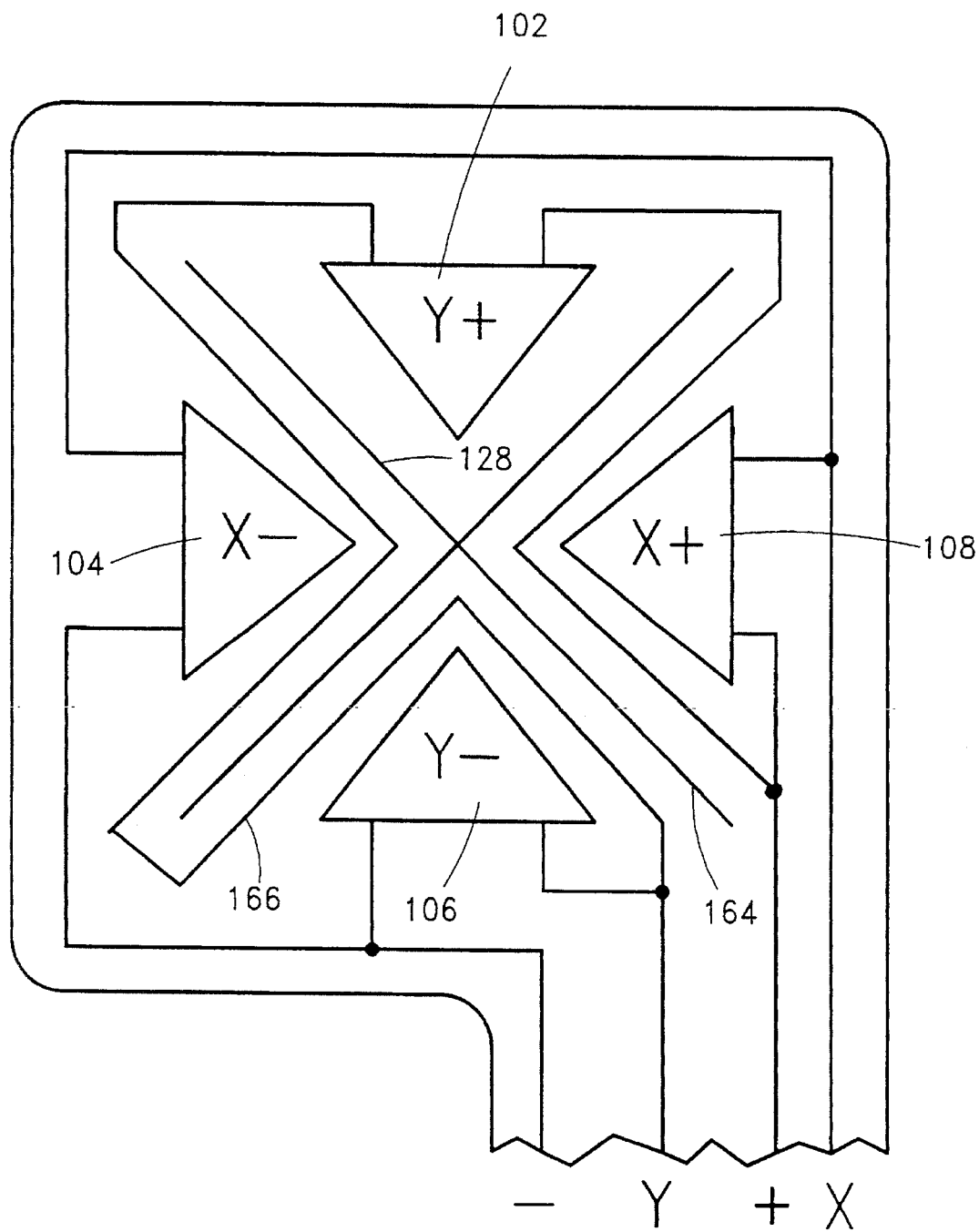
FIG. 7 is a schematic plan view for an alternative wiring scheme for the stress sensitive patterns.
Figure 8:
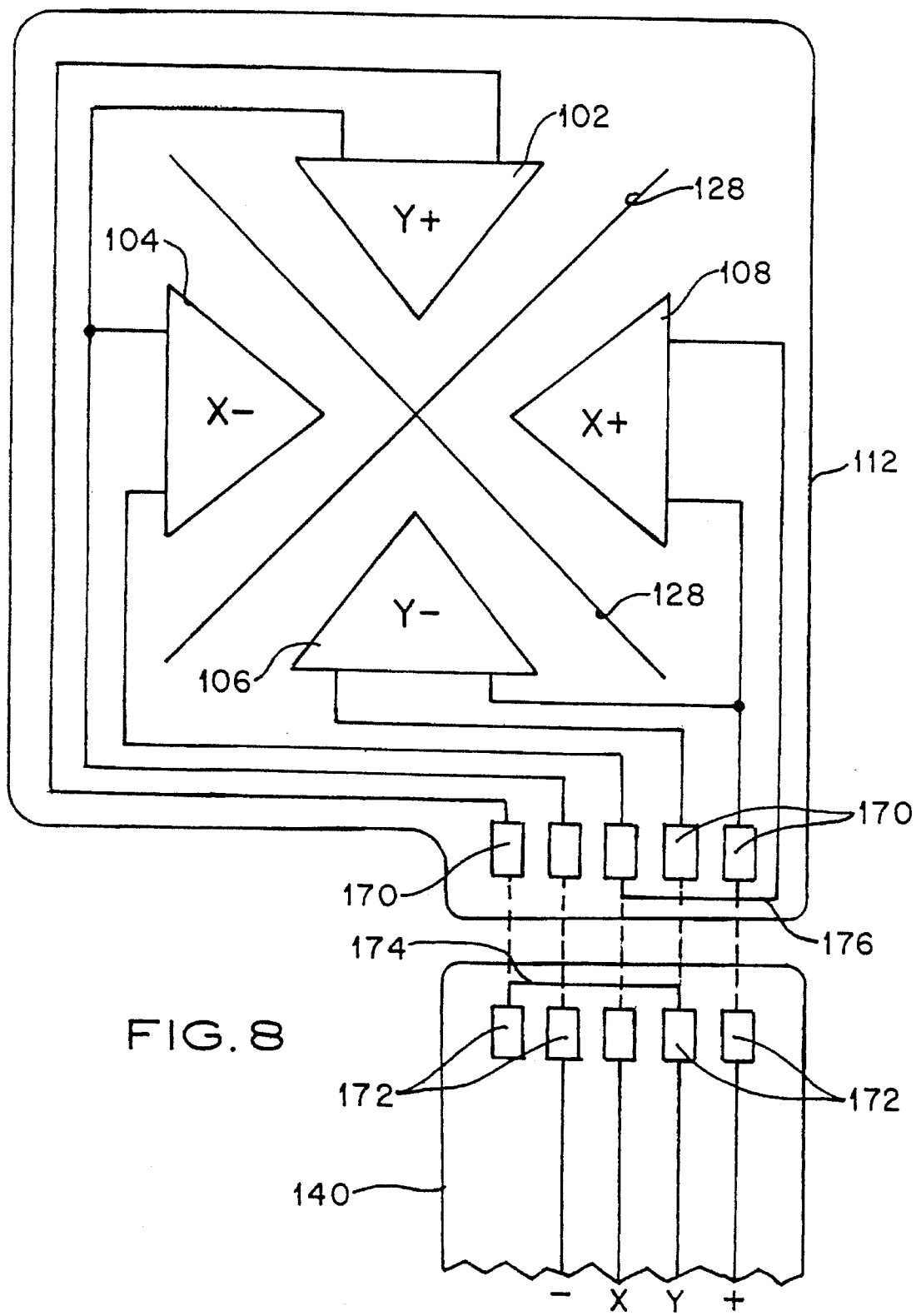
FIG. 8 is a schematic plan view for a second alternative wiring scheme for the stress sensitive patterns.

Above we have described one embodiment of our present invention. A number of changes can be made in this embodiment without departing from the invention. For instance as shown in FIG. 7, the number of leads needed to connect the strain sensitive patterns 102 to 108 on a single surface to the power source and the sense amplifiers can be reduced to four by providing power and signal leads 164 and 166 respectively between the cuts 128 in the square segment 112 of the piece 110 and the strain sensitive patterns 104 to 108. Alternatively, the number of wires can be reduced by having separate rectangular and leg portions 112 and 140. The wiring on the rectangular and leg portions can then be placed on facing surfaces of the two pieces. As shown in FIG. 8, contacts 170 face upwardly to mate and be bonded to downwardly facing terminals 172 on the leg portion. Connections 174 and 176 join common connections to the same terminal. Leads to the contacts must be insulated from each other to prevent short circuits at cross over points. Therefore it should be understood that the invention is not to be limited by the above-described embodiment but should be only limited by the spirit of the scope of the appended claims.

What is claimed:

1. A force sensitive transducer for a data entry keyboard comprising:

a member upstanding from the keyboard; and orthogonally oriented strain sensitive patterns formed together on a flexible planar sheet surrounding the member and bent so that the portions of the base with strain sensitive patterns thereon rise up out of the plane of the base and are adhered against the sides of the member to sense force exerted on the member.

2. The force sensitive transducer of claim 1 wherein: there are two orthogonally oriented pairs of opposing serpentine patterns; said pairs connected to form electrical half bridge circuits with one opposing pair measuring force in the x direction and the other opposing pair measuring force in the y direction.

3. The force sensitive transducer of claim 2 wherein said planar base has an x shaped slice with one of said strain sensitive patterns in each of the V's formed by the slice and the member positioned in the juncture of the slice.

4. The force sensitive transducer of claim 3 wherein each strain sensitive pattern is connected to one power lead and one signal line, with the power lead and signal line for one of the patterns located between the x shaped slice and other of the patterns.

5. A method of assembling a force sensitive transducer for a data entry keyboard comprising the steps of:

forming multiple strain sensitive patterns on a flat flexible insulating sheet;

providing interior slices in the sheet so that the strain sensitive patterns are on orthogonally oriented tabs;

placing an elongated member upstanding from a base through the slices so that the tabs bend and lie against the sides of the elongated member while the remainder of the flexible sheet lies against the base; and adhering the tabs to the sides of the elongated member.

6. The method of claim 5 including: electrically connecting the strain sensitive patterns in half-bridge circuits to provide electrical signals representative of strain in the upstanding member.

7. The method of claim 6 including: electrically connecting strain sensitive patterns positioned on opposite sides of the upstanding member in series across the terminals of an electrical power source and the common point of the serially connected patterns to a signal terminal.

8. The method of claim 7 including: forming facing connections between the strain sensitive patterns and the terminals on separate pieces of insulating/material and bonding such pieces together.

9. The method of claim 7 including: making connections between the strain sensitive patterns and the terminals between the strain sensitive patterns and the slices.

10. A method of assembling a force sensitive transducer for a data entry keyboard comprising:

forming four triangular shaped strain sensitive patterns together with their connections on a flat flexible insulating sheet;

slicing the insulating sheet in an x shaped pattern so that each of the triangular shaped strain sensitive patterns is on a separate triangular tab;

placing a rectangular shaped elongated member upstanding from a base through the x shaped slices so that the tabs bend up out of the insulating sheet and lie against the four sides of the member while the remainder of the flexible sheet lies flat against the base;

adhering the tabs to the sides of the elongated member; and electrically connecting the electrical connections to the strain sensitive tabs in a circuit that senses changes in surface stresses of the upstanding member.

* * * * *